US012643512B2

(12) United States Patent
Kinder et al.

(10) Patent No.: US 12,643,512 B2
(45) Date of Patent: Jun. 2, 2026

(54) METHOD FOR OPERATING A BRAKE SYSTEM

(71) Applicant: Robert Bosch GmbH, Stuttgart (DE)

(72) Inventors: Ralf Kinder, Auenstein (DE); Sabrina Lutz, Fellbach (DE); Herbert Vollert, Vaihingen/Enz (DE); Reid Collins, Forchtenberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 47 days.

(21) Appl. No.: 18/859,594

(22) PCT Filed: Jul. 31, 2023

(86) PCT No.: PCT/EP2023/071171
§ 371 (c)(1),
(2) Date: Oct. 24, 2024

(87) PCT Pub. No.: WO2024/052009
PCT Pub. Date: Mar. 14, 2024

(65) Prior Publication Data
US 2025/0170997 A1 May 29, 2025

(30) Foreign Application Priority Data
Sep. 7, 2022 (DE) ..................... 10 2022 209 274.0

(51) Int. Cl.
*B60T 8/172* (2006.01)
*B60Q 9/00* (2006.01)
(Continued)

(52) U.S. Cl.
CPC ................ *B60T 8/172* (2013.01); *B60Q 9/00* (2013.01); *B60T 8/171* (2013.01); *B60T 13/686* (2013.01);
(Continued)

(58) Field of Classification Search
CPC .. G07C 5/0808; G07C 5/0825; G07C 5/0833; B60T 13/662; B60T 13/686;
(Continued)

(56) References Cited

U.S. PATENT DOCUMENTS

2017/0282877 A1* 10/2017 Besier ..................... B60T 8/885
2020/0062226 A1* 2/2020 Frank .................... B60T 8/1701
(Continued)

FOREIGN PATENT DOCUMENTS

DE 102014225958 A1 6/2016
DE 102017000472 A1 7/2018
(Continued)

OTHER PUBLICATIONS

International Search Report for PCT/EP2023/071171, Issued Nov. 15, 2023.

*Primary Examiner* — Carl C Staubach
(74) *Attorney, Agent, or Firm* — NORTON ROSE FULBRIGHT US LLP

(57) ABSTRACT

A method for operating a brake system, which includes a power brake and a vehicle dynamics control, after detecting that the level in a brake fluid reservoir of the brake system has fallen below a minimum fill level. The method includes detecting a brake signal, advancing a power piston to a forward position in which the required brake pressure is achieved, ascertaining the amount of travel of the power piston from the home position to the current position, holding the brake pressure and further advancing the power piston by a correction distance if the brake pressure decreases during the holding. The method also includes retracting the power piston by the ascertained amount of travel after the braking process has ended and degrading the brake system when a limit value for the forward position of the power piston has been reached.

12 Claims, 3 Drawing Sheets

(51) Int. Cl.
    *B60T 8/171*         (2006.01)
    *B60T 13/68*        (2006.01)
    *G07C 5/08*          (2006.01)
    *B60Q 5/00*         (2006.01)

(52) U.S. Cl.
    CPC ......... *G07C 5/0808* (2013.01); *G07C 5/0825*
          (2013.01); *G07C 5/0833* (2013.01); *B60Q*
          *5/005* (2013.01); *B60T 2220/04* (2013.01);
            *B60T 2270/402* (2013.01)

(58) Field of Classification Search
    CPC ........... B60T 2220/04; B60T 2270/402; B60T
          8/171; B60T 8/172; B60T 8/92; B60Q
            5/005; B60Q 9/00
    See application file for complete search history.

(56)             References Cited

U.S. PATENT DOCUMENTS

| | | | | |
|---|---|---|---|---|
| 2020/0070797 A1* | 3/2020 | Plewnia | ............... | B60T 15/041 |
| 2021/0146906 A1* | 5/2021 | Ganzel | ................ | G07C 5/0808 |
| 2021/0146908 A1* | 5/2021 | Ganzel | ................ | B60T 13/745 |
| 2024/0367629 A1* | 11/2024 | Bubeck | .................. | B60T 8/885 |

FOREIGN PATENT DOCUMENTS

| | | |
|---|---|---|
| DE | 102018214353 A1 | 2/2020 |
| DE | 102018222488 A1 | 6/2020 |

* cited by examiner

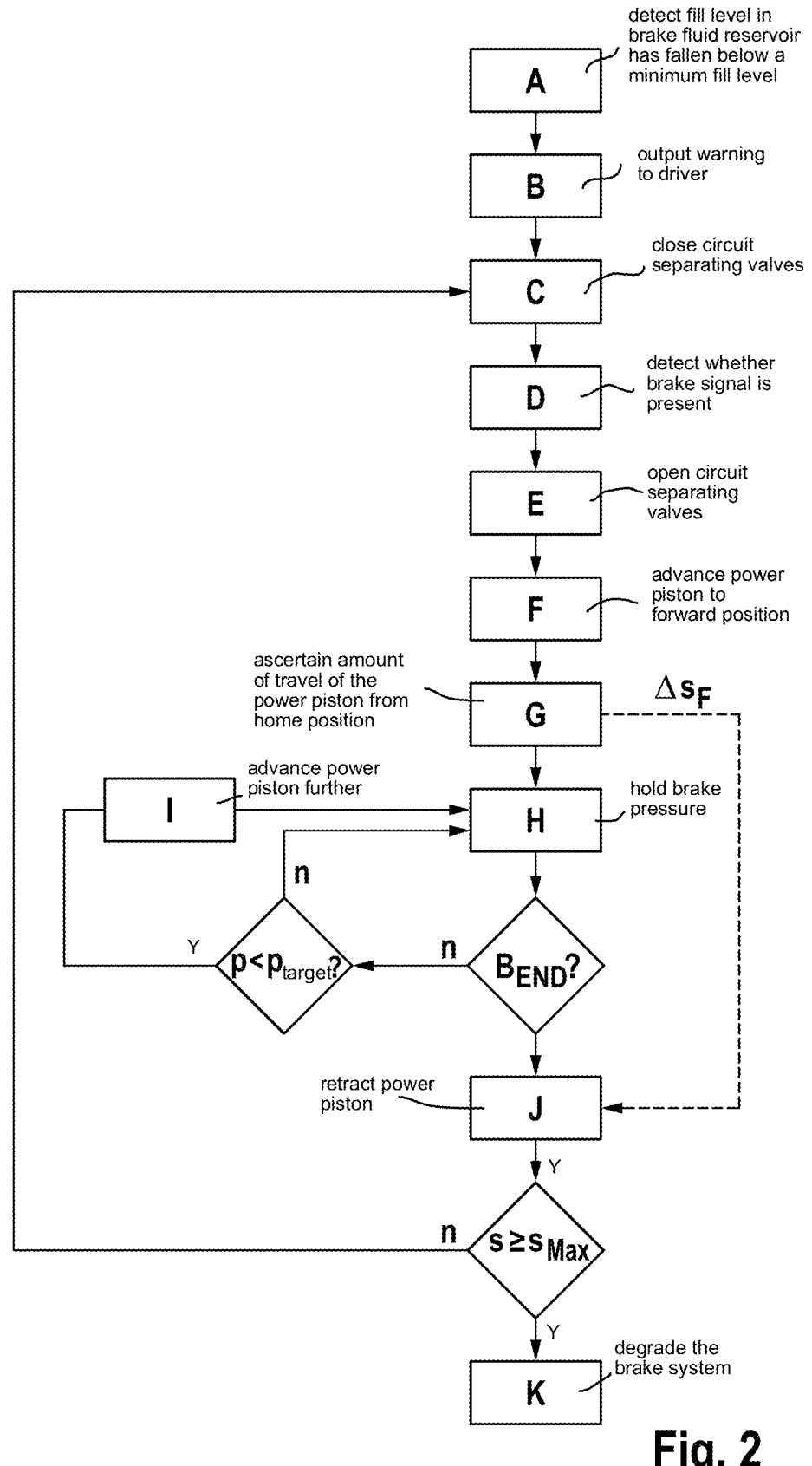

detect fill level in brake fluid reservoir has fallen below a minimum fill level

A output warning to driver

B close circuit separating valves

C detect whether brake signal is present

D open circuit separating valves

E advance power piston to forward position

F ascertain amount of travel of the power piston from home position

G        $\Delta s_F$ advance power piston further

I hold brake pressure

H

$p < p_{target}?$        $B_{END}?$ retract power piston

J

$s \geq s_{Max}$ degrade the brake system

METHOD FOR OPERATING A BRAKE SYSTEM

FIELD

The present invention relates to a method for operating a brake system consisting of a power brake and a vehicle dynamics control after detecting that the level in a brake fluid reservoir of the brake system has fallen below a minimum fill level. The present invention also relates to a brake system with which such a method can be carried out.

BACKGROUND INFORMATION

The current power brake systems are characterized by the fact that they are mechanically and/or hydraulically coupled to the driver. This is achieved by using a brake pedal that is connected to an input rod. The driver braking request is detected in the full system via this input rod and a pedal feel is realized in the form of a force/travel characteristic. The pressure is then built up via a piston that is hydraulically decoupled from the foot of the driver. In the fallback level, the foot of the driver is then coupled to the wheel brake cylinders by means of a brake cylinder actuated by muscle power, which allows the driver to apply brake pressure using his foot. It is thus still possible to brake the vehicle in the event of a fault.

German Patent Application No. DE 10 2018 222 488 A1 describes an electrohydraulic vehicle power brake system for an autonomously driving land vehicle. Such an electrohydraulic vehicle power brake system is equipped with two redundant power brake pressure generators so that, in the event of independent driving and failure of one power brake pressure generator, the other power brake pressure generator can brake the vehicle without driver intervention.

An object of the present invention is to provide a method with which the brake system can continue to be kept in a safe state when it is detected that the level in a brake fluid reservoir has fallen below a minimum fill level.

This object may be achieved by a method for operating a brake system having certain features of the present invention. Preferred embodiments of the present invention are disclosed herein.

SUMMARY

The present invention provides a method for operating a brake system which includes a power brake and a vehicle dynamics control after detecting that the level in a brake fluid reservoir of the brake system has fallen below a minimum fill level. After detecting that the level has fallen below the minimum fill level, it is assumed that there is a leak in the brake system through which some of the brake fluid has already been lost. According to an example embodiment of the present invention, the method comprises the steps of detecting a brake signal, advancing a power piston to a forward position in which the required brake pressure is achieved, and ascertaining the amount of travel of the power piston from the home position to the current position. The amount of travel is a value for an advance distance of the power piston, which can be specified in mm, for example. The home position is a position of the power piston in which no brake pressure is generated.

In a further step, the brake pressure is held and, if the brake pressure decreases during the holding, the power piston is advanced further by a correction distance. A drop in brake pressure can occur as a result of a loss of brake fluid due to the leak. To keep the brake pressure constant despite the leak, the power piston is moved in the direction of an outlet of the power cylinder to compensate the loss of brake fluid.

After the braking process has ended, the power piston is moved back by the ascertained amount of travel. The power piston is thus moved back by the same amount of travel over which the brake pressure was first achieved. The power piston is therefore not additionally also moved back by the correction distance. The piston consequently does not reach the previous home position before a next braking. Since brake fluid may have been lost due to the leak during the braking operation, air is prevented from being introduced into the brake system. The brake system can therefore continue to be held in a safe state and does not have to be degraded as soon as it is detected that the level has fallen below the minimum fill level.

If a limit value for the forward position of the power piston is reached, the brake system is degraded. The limit value can be fixedly defined or variably adjusted. Degradation of the brake system is understood to mean that said brake system goes into an emergency mode in which full functionality is no longer available. The brake system is therefore operated in a degraded state well before the braking power fails, so that limited braking is still possible. This ensures that, despite prolonged operation of the brake system, the brake system is operated in a degraded mode early enough. The safety of such a brake system is thus still ensured.

In a preferred embodiment of the present invention, a front end position of the power piston at which no further pressure build-up by the power piston is possible is selected as the limit value. A front end position of the power piston is the position at which a maximum travel distance of the power piston is achieved. This can be a position at which the power piston has reached the base of the power cylinder, for instance. In this case, there is no brake fluid in the power cylinder with which the brake pressure could be increased. Selecting this limit value makes it possible to keep the brake system in a safe non-degraded state for a maximum amount of time, so that the full braking power is available.

In another preferred embodiment of the present invention, a degradation of the brake system is carried out immediately upon reaching the limit value. When the limit value is reached, it may not be possible to generate any additional brake pressure. In order to be able to continue braking the vehicle when the brake pressure is reduced due to the leak, said brake pressure is degraded immediately. This provides sufficient safety for braking the vehicle.

Preferably, a distance before reaching an end position is selected as the limit value for the forward position, so that, after reaching the limit value, the braking operation can be ended before reaching the end position by including a correction distance. After the limit value is reached, there is therefore sufficient brake fluid in the power cylinder for the current braking operation despite a correction distance, so that the braking operation can be ended safely. Advantageously, a specific value is assumed for the correction distance. The brake system therefore does not have to be degraded during the braking operation. Since degradation during the braking operation leads to loss of braking force, the current braking operation can be ended with full braking force. This increases the safety of the braking operation.

In an advantageous further development of the present invention, a correction distance from previous braking operations is used to ascertain a limit value. Since the correction distance depends on the type and size of leak, a fixedly assumed correction distance may be too small. Typically, however, several braking cycles are carried out before the limit value is reached. Based on the correction distances needed during these braking cycles, the correction distance for ascertaining a limit value can be estimated more easily, so that such a method can keep the brake system in a safe state for longer.

According to an example embodiment of the present invention, a degradation of the brake system is advantageously carried out after the braking operation has been completed. The brake system therefore does not have to be degraded during the braking operation. This increases the safety of the brake system.

In another advantageous embodiment of the present invention, circuit separating valves are closed in an unbraked state to separate the brake circuits of the vehicle dynamics control. The two brake circuits are separated from one another by the circuit separating valves. This prevents the other brake circuit from running dry in addition to the circuit with the leak. Thus, at least in the degraded state, one brake circuit is available with which a braking force can be applied to the vehicle brakes.

According to an example embodiment of the present invention, a warning is output to a user after it is detected that the level in a brake fluid reservoir of the brake system has fallen below a minimum fill level. The driver is thus notified ahead of time, before the brake system is degraded, that there is a problem with the brake system so that he/she can still safely drive to the nearest workshop. The warning is advantageously output optically, acoustically and/or haptically.

According to an example embodiment of the present invention, after a degradation of the brake system, the brake pressure is preferably applied via the vehicle dynamics control and/or a master brake cylinder. Thus, after a degradation, no brake pressure is applied via the power cylinder. Brake pressure can therefore continue to be applied in emergency mode despite the power piston being positioned in a front end position, so that the safety of the brake system remains ensured.

According to an example embodiment of the present invention, after a degradation of the brake system, the brake circuits are advantageously separated via circuit separating valves to separate the brake circuits of the vehicle dynamics control. Degradation eliminates the need for pressure generation by the power piston, so that the circuit separating valves do not have to be opened. This limits the effect of a leak to one brake circuit, so that braking with at least one brake circuit is possible in emergency mode. This increases the fail-safety of the brake system.

The object of the present invention may further be solved by a brake system comprising a power brake and a vehicle dynamics control and a control device which is configured to carry out the method according to the present invention for operating a brake system when it is detected that the level in a brake fluid reservoir of the brake system has fallen below a minimum fill level. The advantages mentioned with regard to the method of the present invention are achieved by means of such a brake system. Such a brake system can therefore be kept in a safe state for longer.

Embodiment examples of the present invention are shown in the figures and explained in more detail in the following description.

BRIEF DESCRIPTION OF THE DRAWINGS

FIG. 2 shows an illustration of a method for operating the brake system according to an embodiment example of the present invention.

DETAILED DESCRIPTION OF EXAMPLE EMBODIMENTS

Figure 1:
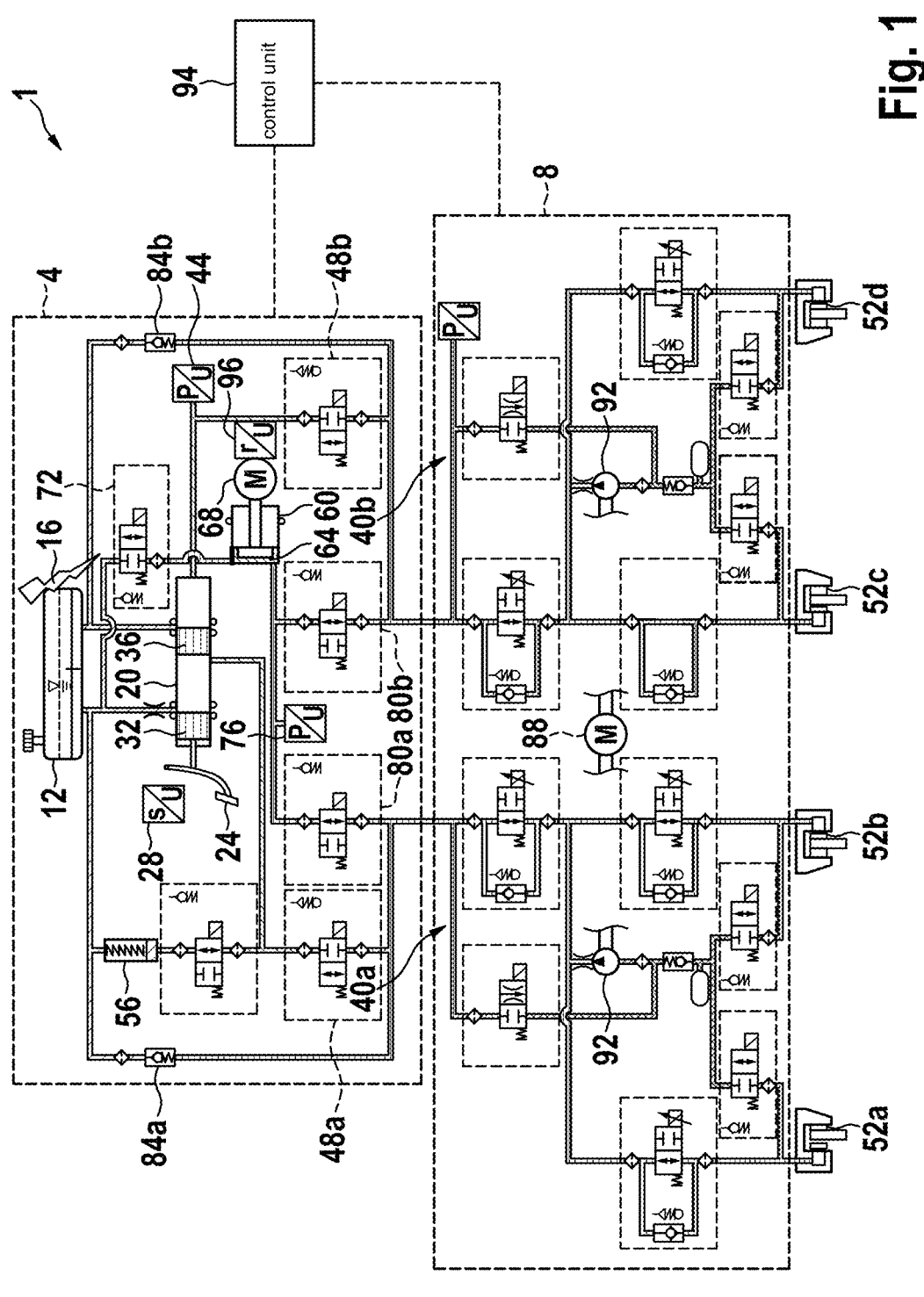
FIG. 1 shows an embodiment example of a brake system for carrying out the method during a braking operation, according to the present invention.

FIG. 1 shows an embodiment example of a brake system 1 for carrying out the method. The brake system 1 is shown during a braking operation. The brake system 1 comprises a power brake 4 and a vehicle dynamics control 8. The power brake 4 comprises a brake fluid reservoir 12, the fill level of which can be ascertained using a not depicted fill level sensor. In the brake system 1 shown here, there is a signal 16 that indicates that the fill level is below a minimum fill level.

The brake system 1 also comprises a master brake cylinder 20, which can be actuated by a driver via a brake pedal 24 and is supplied with brake fluid from the brake fluid reservoir 12. The travel of the brake pedal is measured using a travel sensor 28. The master brake cylinder 20 comprises a first and a second brake piston 32, 36, each of which can be used to control a separate brake circuit 40a, 40b. The pressure generated in the master brake cylinder 20 is measured by means of a master brake cylinder pressure sensor 44.

In normal operation of the brake system 1, the master brake cylinder separating valves 48a, 48b are closed. The master brake cylinder separating valves 48a, 48b can be used to connect the master cylinder 20 to the brake circuits 40a, 40b of the vehicle dynamics control 8 to apply brake pressure to the vehicle brakes 52a, 52b, 52c, 52d of the brake system 1. In the case shown here, the pressure of the master brake cylinder 20 is used actuate a brake feel simulator 56, via which a braking feeling is created for the driver.

The power brake 4 also comprises a power cylinder 60, in which a power piston 64 is disposed that can be moved via a motor 68 in the axial direction of the power cylinder 60 to generate brake pressure. In the figure shown here, the power piston 64 is shown in a front end position. The power cylinder 60 is fluidically connected to the brake fluid reservoir 12 via a power cylinder valve 72. The brake pressure generated via the power piston 64 is measured using a brake pressure sensor 76. The power cylinder 60 is connected to the two brake circuits 40a, 40b of the vehicle dynamics control 8 via two circuit separating valves 80a, 80b.

To supply the brake circuits 40a, 40b of the vehicle dynamics control 8 with brake fluid, the brake circuits 40a, 40b are connected directly to the brake fluid reservoir 12 via a respective check valve 84a, 84b. This check valve 84a, 84b allows the vehicle dynamics control 8 to draw brake fluid out of the brake fluid reservoir 12 as needed. To regulate the vehicle dynamics and to apply and release brake pressure to the vehicle brakes 52a, 52b, 52c, 52d, the vehicle dynamics control 8 comprises various inlet and outlet valves, as well as a brake fluid pump 92 driven by a pump motor 88.

The brake system 1 also comprises a control unit 94, which is connected to the power brake 4 and to the vehicle dynamics control 8 in such a way that signals can be transmitted. This control unit 94 receives the measured values of the sensors and controls the valves of the power brake 4 and the vehicle dynamics control 8, as well as the movement of the power piston 64. The method according to the present invention as shown in FIG. 2 runs on this control unit 94.

FIG. 2 shows an illustration of a method for operating the brake system 1 according to an embodiment example of the present invention. In a first step A, it is detected that the level in the brake fluid reservoir 12 has fallen below a minimum fill level. In a following step B, a warning is output to a driver. The warning can be in the form of a warning lamp that lights up. The brake system 1 is then operated in a corresponding leak mode. Since such a leak causes a loss of brake fluid, the circuit separating valves 80a, 80b are closed in a next step (step C) during the unbraked state to separate the brake circuits 40a, 40b. This prevents both brake circuits 40a, 40b from running dry due to the leak, so that at least one of the brake circuits 40a, 40b remains usable for braking the vehicle.

In a next step D, it is detected whether a brake signal is present. If a brake signal is present, the circuit separating valves 80a, 80b are opened again in a next step E. This ensures that the brake pressure generated via the power piston 64 can be applied to the brake circuits 40a, 40b and thus to the vehicle brakes 52a, 52b, 52c, 52d. In a following step F, the power piston 64 is accordingly advanced to a forward position corresponding to the brake signal, so that a required brake pressure $p_{target}$ is generated.

Then, in step G, the amount of travel $\Delta s_F$ of the power piston 64 from the home position to the current position is ascertained. This can be ascertained using a rotation sensor 96 attached to the motor 68 for driving the power piston 64. After the required brake pressure $p_{target}$ is achieved, it is held in a next step H. If the brake pressure p measured via the master brake cylinder pressure sensor 44 drops during holding due to the leak, the power piston 64 is advanced further (step I) until the required brake pressure $p_{target}$ is present again. This provides a correction distance $s_K$ of the power piston 64.

After the braking process $B_{END}$ has ended, the power piston 64 is retracted in step J by the amount of travel $\Delta s_F$ ascertained in step G to a home position in which there is no brake pressure p. Due to the correction distance $s_K$, the new home position can be further forward. Lastly, there is a check to see whether a limit value $s_{Max}$ for the forward position of the power piston 64 has been reached, so that no further braking can be carried out. If this is not the case, the method can continue. The method starts again with step C, in which the circuit separating valves 80a, 80b are closed first.

The method can be carried out as many times as necessary until the check indicates that a limit value $s_{Max}$ for the forward position of the power piston 64 has been reached. If this is the case, the brake system 1 is degraded (step K) so that brake pressure p is applied via the vehicle dynamics control 8 and/or the master brake cylinder 20.

Figure 3:
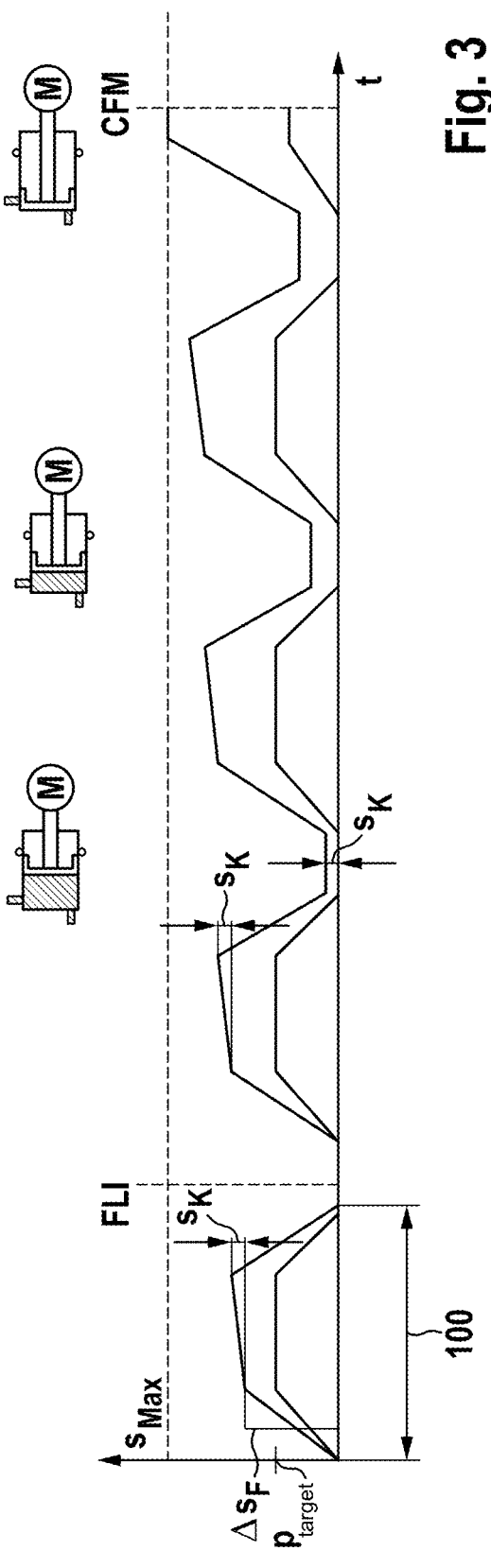
FIG. 3 shows an illustration of a distance/time graph for the power piston in conjunction with the brake pressure.

FIG. 3 shows an illustration of a distance/time graph s/t for the power piston 64 together with the brake pressure p/t. This graph shows several braking cycles 100. The upper curve shows the distance s of the power piston 64, while the lower curve shows the brake pressure p. It can be seen that advancing the power piston 64 increases the brake pressure p until the required brake pressure $p_{target}$ is achieved. Even though the brake pressure $p_{target}$ remains constant, the distance s of the power piston 64 continues to change. This is because the power piston 64 compensates the pressure loss caused by a leak by advancing further. Without a leak, the distance of the power piston would not change once the required brake pressure $p_{target}$ is achieved.

The leak causes a loss of brake fluid. Then, when the level in the brake fluid reservoir 12 falls below a minimum fill level, a warning is output at point FLI and leak mode is activated. In subsequent braking cycles 100, the power piston 64 is retracted after the braking process has ended by only the amount of travel $\Delta s_F$ that was needed to achieve the required brake pressure $p_{target}$ in the first place. The piston is accordingly not retracted by the correction distance $s_K$ required to hold the brake pressure $p_{target}$. The new home position is therefore shifted forward by this correction distance $s_K$.

Consequently, numerous braking cycles can be carried out in leak mode until the power piston 64 has reached the limit value $s_{Max}$ for the forward position. As shown in FIG. 3, said limit value can be at the front end position. From the time CFM at which the limit value $s_{Max}$ is reached, the brake system is operated only in a degraded mode.

The invention claimed is:

1. A method for operating a brake system, which includes a power brake and a vehicle dynamics control, after detecting that a level in a brake fluid reservoir of the brake system has fallen below a minimum fill level, the method comprising the following steps:
   detecting a brake signal;
   advancing a power piston to a forward position in which a required brake pressure is achieved;
   after the advancing, ascertaining an amount of travel of the power piston from a home position to a current position;
   holding a brake pressure and further advancing the power piston by a correction distance when the brake pressure decreases during the holding;
   retracting the power piston by the ascertained amount of travel after a braking process has ended; and
   degrading the brake system when a limit value for a forward position of the power piston has been reached.

2. The method according to claim 1, wherein a front end position of the power piston at which no further pressure build-up by the power piston is possible is the limit value.

3. The method according to claim 2, wherein the degradation of the brake system is carried out immediately upon reaching the limit value.

4. The method according to claim 1, wherein a distance before reaching an end position is the limit value for the forward position, so that, after reaching the limit value, the braking operation can be ended before reaching the end position by including a correction distance.

5. The method according to claim 4, wherein a correction distance from previous braking operations is used to ascertain the limit value.

6. The method according to claim 4, wherein the degradation of the brake system is carried out after the braking operation is complete.

7. The method according to claim 1, wherein circuit separating valves are closed in an unbraked state to separate brake circuits of the vehicle dynamics control.

8. The method according to claim 1, wherein, after detecting that the level in a brake fluid reservoir of the brake system has fallen below the minimum fill level, a warning is output to a user.

9. The method according to claim 8, wherein the warning is output optically and/or acoustically and/or haptically.

10. The method according to claim 1, wherein, after the degradation of the brake system, the brake pressure is applied via the vehicle dynamics control and/or a master brake cylinder.

11. The method according to claim 1, wherein, after the degradation of the brake system, brake circuits are separated via circuit separating valves to separate the brake circuits of the vehicle dynamics control.

12. A brake system, comprising:

a power brake;

a vehicle dynamics control; and a control unit configured to, when it is detected that the level in a brake fluid reservoir of the brake system has fallen below a minimum fill level:

detect a brake signal, advance a power piston to a forward position in which a required brake pressure is achieved, after the advancing, ascertain an amount of travel of the power piston from a home position to a current position, hold a brake pressure and further advancing the power piston by a correction distance when the brake pressure decreases during the holding, retract the power piston by the ascertained amount of travel after a braking process has ended, and degrade the brake system when a limit value for a forward position of the power piston has been reached.

\* \* \* \* \*